April 16, 1940.　　　D. W. HABER　　　2,197,547
HANDLE CONSTRUCTION FOR UTENSILS
Filed Sept. 2, 1937
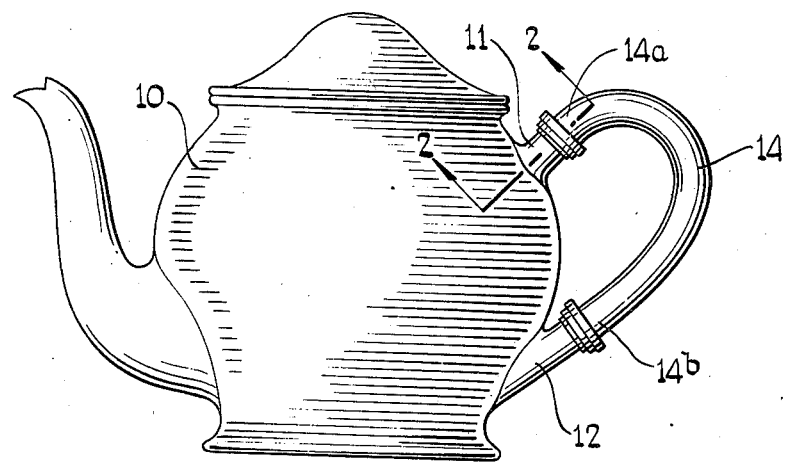
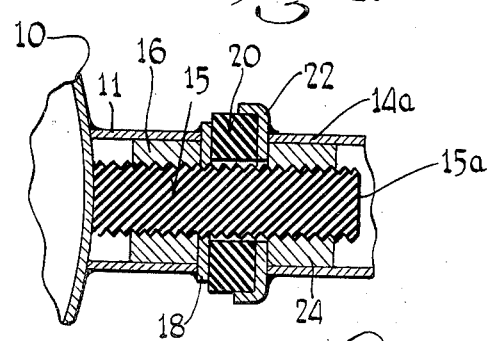
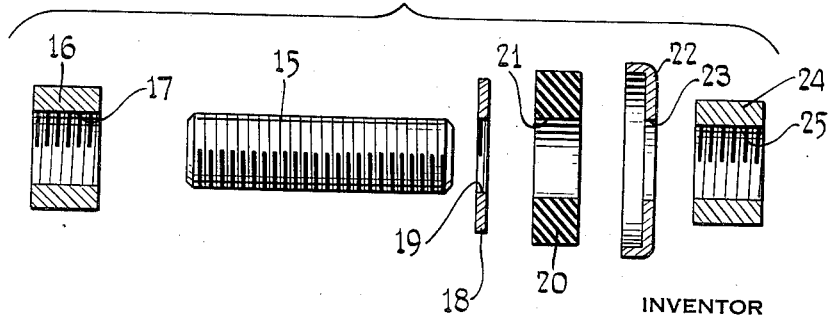
INVENTOR
DAVID W. HABER
BY
ATTORNEY Patented Apr. 16, 1940

2,197,547

UNITED STATES PATENT OFFICE 2,197,547

HANDLE CONSTRUCTION FOR UTENSILS

David W. Haber, New York, N. Y.

Application September 2, 1937, Serial No. 162,101

1 Claim. (Cl. 16—119)

This invention relates to handle construction for utensils, such as pots or similar vessels.

One of the objects of my invention is to provide in combination with a utensil of the character described highly improved means for insulating the handle from the body of said utensil.

Another object of my invention is to provide a simple, compact and durable handle construction for a utensil of the character described which shall be relatively inexpensive to manufacture, easy to assemble, and which at the same time shall be practical and highly efficient.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible embodiments of this invention, Fig. 1 is a side elevational view of a utensil embodying my invention;

Fig. 2 is an enlarged cross-sectional view taken substantially on the line 2—2 of Fig. 1; and Fig. 3 is an exploded view illustrating the method of assembling the parts of my improved handle construction shown in detail in Fig. 2.

Referring now in detail to the drawing, there is disclosed in Fig. 1 a utensil 10 of usual contour and design, and having fixed to the outer wall thereof a pair of tubular support members 11 and 12 adapted to have a handle 14 attached thereto.

Utensils of the type herein disclosed and described are generally made of metallic material, such as copper or silver and are designed to hold hot liquids. Also, in utensils of the type above described, it is often desirable for the sake of appearance that the handle be constructed of a similar metal as that of the body of the utensil. When this is done, it is evident that the heat generated by the hot liquid within the utensil will be transmitted directly to the handle itself, through the wall of the utensil, due to the metal to metal contact, thus making it impractical to lift the utensil by the handle while pouring the hot liquid into a cup.

By my invention, I have provided a construction whereby the metallic handle 14 is heat insulated from the body of the utensil 10. This construction is clearly illustrated in Fig. 2 of the drawing and is designed to be interposed between the ends 14a and 14b of the handle 14, and the members 11 and 12 respectively.

My invention now to be described relates to a unitary assembly of parts shown in Figs. 2 and 3 designed to be interposed between the handle end 14a and the member 11 and it is understood that a similar unitary assembly may be interposed between the handle portion 14b and the member 12.

My improved construction comprises a plug 15 of circular cross-section and externally screw threaded, the said plug being of any suitable heat insulating material, such as, for example, fibre. The plug 15 is adapted to have received thereon a metallic collar 16 having an internally screw threaded aperture 17. The collar 16 may be screwed from the end 15a of the plug 15 to the position as shown in Fig. 2. A metallic ring 18 having an internally threaded aperture 19 is next screwed on to the plug 15 to abut the collar 16. A member 20 of suitable heat insulating material and having a centrally disposed aperture 21 is next freely, slidably placed on the plug 15 to abut the ring 18. The said member 20 is provided with a metallic cap 22 which may be attached thereto by a friction fit as shown in Fig. 2, the said cap 22 being provided with a centrally disposed aperture 23 substantially of the same size as the aperture 21. A second metallic collar 24 having an internally threaded aperture 25 is next screwed on the plug 15 to a position where it abuts the cap 22. After the parts 16, 18, 20, 22 and 24 have been mounted on the plug 15, as above described, the collar 16, which is of a size adapted to fit snugly within the tubular member 11, is then soldered to the said member 11 which in turn is fixed to the body of the utensil 10 by any suitable means such as soldering, or which may be integral therewith.

After a similar plug member 15 completely assembled as above and having a collar 16 has been soldered to the tubular member 12 both ends 14a and 14b of the handle 14 are then soldered to the collars 24.

It is thus seen by my construction as above described that I have provided means whereby the path of heat conduction from the metallic utensil 10 to the metallic handle 14 has been interrupted. As can be clearly seen from Fig. 2 of the drawing, when the heat from the wall of the utensil 10 is transmitted to the member 11, it will be also transmitted to the metallic collar 16 and to the metallic ring 18. However, the plug 15 being of heat insulating material will interrupt the path of heat conduction. Also, it is seen that the handle portion 14a which is soldered to the collar 24 and which abuts the metal cap 22 will be prevented from having heat conducted thereto from the utensil 10 by means of the plug 15. A direct path of heat conduction through the metallic member is further prevented by the insulating member 20 interposed between the metallic ring 18 and the metallic cap 22.

It is also noted that my invention is adapted for use in connection with utensils which have already been manufactured with the tubular metallic handle soldered directly to the body of the utensil. By merely cutting off the handle at the points at each end thereof adjacent the body of the utensil and then interposing between the handle ends and the utensil, my assembled construction as shown in Fig. 2 of the drawing, I am able to insulate the handle from the utensil.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

Handle attaching means for utensils and the like comprising a member externally screw threaded and being of heat insulating material, a pair of metallic collars threadedly received on said heat insulating member, said collars being spaced from each other, metal washer members fixed to the adjacent inner ends of said collars and a heat insulating washer interposed between said metal washers, one of said metal washers being threadedly received on said threaded insulating member and the other of said metal washer members being freely received on said threaded insulating member, said last named metal washer member being fixed to said insulating washer.

DAVID W. HABER.